(12) United States Patent
Coughlin et al.

(10) Patent No.: US 8,849,739 B1
(45) Date of Patent: Sep. 30, 2014

(54) SYSTEM AND METHOD FOR GUIDING KNOWLEDGE MANAGEMENT

(76) Inventors: Edward Coughlin, Roseburg, OR (US); Amy Coughlin, Roseburg, OR (US)

( * ) Notice: Subject to any disclaimer, the term of this patent is extended or adjusted under 35 U.S.C. 154(b) by 287 days.

(21) Appl. No.: 13/594,725

(22) Filed: Aug. 24, 2012

Related U.S. Application Data

(60) Provisional application No. 61/528,198, filed on Aug. 27, 2011.

(51) Int. Cl.
*G06F 17/00* (2006.01)
*G06N 5/02* (2006.01)

(52) U.S. Cl.
USPC ............................................................ 706/46

(58) Field of Classification Search
None
See application file for complete search history.

(56) References Cited

U.S. PATENT DOCUMENTS

| | | | | |
|---|---|---|---|---|
| 7,730,063 B2 * | 6/2010 | Eder | ............................. | 707/736 |
| 8,275,736 B2 * | 9/2012 | Guo et al. | ........................ | 706/54 |
| 8,370,895 B2 * | 2/2013 | DiCrescenzo et al. | ............. | 726/1 |
| 8,468,244 B2 * | 6/2013 | Redlich et al. | ................. | 709/225 |
| 8,612,270 B2 * | 12/2013 | Hazy | ............................. | 705/7.11 |
| 8,731,455 B2 * | 5/2014 | Colby et al. | ................... | 434/350 |
| 8,743,708 B1 * | 6/2014 | Robertson et al. | ............. | 370/252 |

* cited by examiner

*Primary Examiner* — Michael B Holmes
(74) *Attorney, Agent, or Firm* — Plager Schack LLP (57) ABSTRACT

A system and method of guiding knowledge management including a knowledge artifact guiding system server including an ontological lexicon, a game rule base and interest group management. The system further include a knowledge artifact guiding system client including a guided context processor subsystem with a contextual processor and a post contextual processor, and a human computer interface with a natural language handler, a game display algorithm engine and a game position move adapter. The ontological lexicon is configured to provide lexicon updates to the knowledge artifact guiding system server and the interest group management is configured to provide position data to the knowledge artifact guiding system server. The guided contextual processor subsystem and the knowledge artifact guiding system server share knowledge artifact classification contexts and suggested knowledge artifacts. The human computer interface subsystem and the knowledge artifact guiding system server share human computer interface position data.

3 Claims, 8 Drawing Sheets

PARENTING

| PRENATAL DIAGNOSIS (KIND-OF) DIAGNOSTIC PROCEDURE (KN) ||||||
|---|---|---|---|---|
| CONTEXT | RELATIONSHIP | LEVEL | PUBLICATIONS | ADOPTIONS |
| AMNIO-CENTESIS | KIND-OF | INF | 120 | 125 |
| ULTRASON-OGRAPHY | KIND-OF | INF | 98 | 203 |
| BIRTH DEFECT RISK FACTORS | PART-OF | KN | 11 | 12 |
| FALSE POSITIVES AND NEGATIVES | PART-OF | KN | 1300 | 200 |
| PUBLICATION | | SOURCE | | RANK |
| PRENATAL SCREENING FALSE POSITIVES AND DETECTION RATES | | QUEST DIAGNOSTICS | | 177 |
| FIRST TRIMESTER SCREENING | | AMERICAN PREGNANCY ASSOCIATION | | 88 |
| PRENATAL DIAGNOSIS DEFINITION | | WIKIPEDIA | | 65 |

FIG. 6

PUMPKIN RIDGE GOLF CLUB

| GHOST CREEK COURSE (PART-OF) PUMPKIN RIDGE GOLF CLUB (KN/2501/182) |||||
|---|---|---|---|---|
| CONTEXT | RELATIONSHIP | LEVEL | PUBLICATIONS | ADOPTIONS |
| HOLE 1 CADDY TIPS | APPLICATION | KN | 2 | 15 |
| HOLE 2 CADDY TIPS | APPLICATION | KN | 5 | 15 |
| HOLE 3 CADDY TIPS | APPLICATION | KN | 3 | 12 |
| HOLE 4 CADDY TIPS | APPLICATION | KN | 2 | 12 |
| 4 OF 18 KACCS SHOWN |||||
| PUBLICATION | | SOURCE | | RANKING |
| CADDY INSTRUCTION | | PUMPKIN RIDGE | | 1026 |

FIG. 7

PUMPKIN RIDGE GOLF CLUB

| HOLE 1 CADDY TIPS (APPLICATION) GHOST CREEK COURSE (KN/2501/18) ||||||
|---|---|---|---|---|
| CONTEXT | RELATIONSHIP | LEVEL | PUBLICATIONS | ADOPTIONS |
| FAIRWAY TIPS | APPLICATION | KN | 1 | 15 |
| GREEN TIPS | APPLICATION | KN | 1 | 15 |
| PUBLICATION | SOURCE | | RANKING ||
| FAIRWAY CLUB SELECTION AND PLAYING STRATEGIES | CADDY LIBRARY | | 995 ||
| GREEN LAYOUT AND PLAYING STRATEGIES | CADDY LIBRARY | | 725 ||

FIG.8

PUMPKIN RIDGE GOLF CLUB

| HOLE 1 CADDY TIPS (PART-OF) GHOST CREEK COURSE (KN/1800/27) ||||||
|---|---|---|---|---|
| CONTEXT | RELATIONSHIP | LEVEL | PUBLICATIONS | ADOPTIONS |
| FAIRWAY TIPS | APPLICATION | KN | 1 | 15 |
| GREEN TIPS | APPLICATION | KN | 1 | 15 |
| CHAMPIONSHIP TOURNAMENT TIPS | APPLICATION | KN | 1 | 1 |
| PUBLICATION | SOURCE | | RANKING ||
| FAIRWAY CLUB SELECTION AND PLAYING STRATEGIES | CADDY LIBRARY | | 1750 ||
| GREEN LAYOUT AND PLAYING STRATEGIES | CADDY LIBRARY | | 1750 ||
| TIPS FROM THE 2007 US WOMAN'S OPEN | CADDY LIBRARY | | 1600 ||

FIG.9

PUMPKIN RIDGE GOLF CLUB

| SCORE POTENTIAL |
|---|
| NOTE: SCORE POTENTIAL IS A PRE-QUALIFIED CALCULATION OF THE AMOUNT OF CREDITS (POSITIVE OR NEGATIVE) AND MEMBER RATING (INCREASE OR DECREASE) THAT MAY RESULT IF YOUR KACC IS ACCEPTED IN TOTALITY<br><br>POTENTIAL INTEREST GROUP CREDITS = + 4<br>POTENTIAL RATING CHANGE = 2004 |

FIG. 10

USING PUMPKIN RIDGE - GHOST CREEK COURSE

HOLE 1: PAR 4  447 YDS  392 YDS  372 YDS  328 YDS

PASTED FROM <HTTP://WWW.PUMPKINRIDGE.COM/GHOST-CREEK/OVERVIEW>

GHOST CREEK STARTS TOUGH WITH A BIGGER-THAN-NORMAL HOLE. A PAR FOUR OF NEAR MAXIMUM LENGTH WITH A LARGE GREEN THAT IS DIFFICULT BECAUSE IT IS RAISED. OVER THE BACK WOULD MAKE FOR A POOR START. THE HOLLOW BEHIND THE GREEN IS SIX FEET DEEP IN PLACES.

FAIRWAY TIPS

THE 1ST HOLE AT PUMPKIN RIDGE IS A LONG PAR 4 WITH PLENTY OF TROUBLE SURROUNDING THE GREEN, AND REQUIRES A LENGTHY CARRY TO A TWO TIERED GREEN. FROM TEE BOX TO GREEN, EVERYTHING FEEDS TO THE LEFT WITH THREE UNIQUE TIERS MOVING RIGHT TO LEFT. THE GREEN ALSO INCLUDES THREE TIERS ON A LONG GREEN, MEANING YOU MAY BE LOOKING AT A VERY LONG PUTT IF YOU DON'T STICK IT CLOSE. PAR IS A GREAT SCORE ON THIS HOLE.

PASTED FROM <HTTP://WWW.PUMPKINRIDGE.COM/GHOST-CREEK/
        CADDY LIBRARY/FAIRWAY TIPS>

2007 U.S. WOMEN'S OPEN - HOLE 1 TIPS

ONE HAS SOME SURPRISES BECAUSE OF THE ELEVATION CHANGE AND THE SUBTLETIES AROUND THE GREEN ARE DIFFICULT TO READ FROM THE ELEVATED TEE. CLUB SELECTION IS CRUCIAL. IN THE FINAL ROUND OF THE 2007 U.S. WOMAN'S TOUR CHAMPIONSHIP, DENISE DUVAL HAD A HOLE-IN-ONE HERE ON HER WAY TO WINNING THE TOURNAMENT. SHE WAITED FOR THE SHIFTING WIND DIRECTION TO CHANGE AND CARRY THE BALL OVER THE 3RD TERRACE. THE TRICK TO PLAYING TO THE RIGHT IS TO AVOID A SECOND SHOT FROM THE 248 YD BLACKBERRY BUSHES LURKING ON THE RIGHT. THE FIRST SHOT MUST LINE UP FOR A SECOND STROKE THAT WILL CARRY THE BALL TO THE 2ND TERRACE. WIND IS ALWAYS A FACTOR ON HOLE 1 AND TYPICALLY SHIFTS EVERY FEW MINUTES. IF THE PLAYER CAN WAIT FOR THE WIND TO SHIFT BEHIND HIM, THE BALL WILL CARRY TO A BETTER POSITION AND THE RIGHT SIDE OF THE FAIRWAY BECOMES A MORE POSSIBLE SHOT.

PASTED FROM <HTTP://WWW.PUMPKINRIDGE.COM/GHOST-CREEK/CADDY
        LIBRARY/JOHN CADDY>

FIG. 11

SYSTEM AND METHOD FOR GUIDING KNOWLEDGE MANAGEMENT

CROSS-REFERENCE TO RELATED APPLICATION

The present application claims priority to earlier filed U.S. Provisional Application Ser. No. 61/528,198, filed on Aug. 27, 2011, the disclosure of which in incorporated herein by reference in its entirety.

OVERVIEW

The present disclosure relates to a system and method for guiding knowledge management that utilizes natural language, game theory and social networking methods. Through these methods, the system and method of the present disclosure may guide knowledge consumers and knowledge workers during the pursuit of acquiring, building and sharing knowledge in a knowledge community setting.

Within the present disclosure, Knowledge Management (KM) is defined as a range of strategies and practices used in an organization to identify, create, represent, distribute, and enable adoption of insights and experiences, either embodied in individuals or embedded in organizations as processes or practices. Information Management (IM) refers to information collections stored in one or more sources, and the organization, control, and distribution of that information to one or more audiences. An Information Artifact refers to a collection of facts or data. A Knowledge Artifact represents an encoding of information packaged in a form that is useful for answering questions, solving problems, advising, offering insights or instructing.

Ontological Lexicons are electronic databases that store Ontologies, which formally represent knowledge as a set of concepts within a domain, and the relationships among those concepts. It renders shared vocabulary and taxonomy, which models and describes a domain with the definition of objects and/or concepts and their properties and relations. An Ontological Lexical Hierarchy is a series of natural language terms that model their conceptual order from the most general to the most specialized definition. For instance, a Robin is a kind of Bird, which is a kind of Animal, which is a kind of Life Form. In addition to hierarchical relationships, the Ontological Lexical Hierarchy codifies the grammatical function of each concept (noun, verb, etc.) and may include other relationships, such as synonyms and antonyms.

BACKGROUND

Daily existence in today's world requires a heavy reliance on acquiring and applying new knowledge for private and professional success. However, there is a morass of information offered through online information portals available over the internet or within internal electronic networks. Those portals are deficient in meeting the needs of both knowledge builders and knowledge consumers because they do not provide effective means for knowledge preservation and community-based knowledge building. Deficiencies in the conventional information portals include but are not limited to:
  Lack of credibility of information referral services—Proprietary logic for how information products are chosen is often based on paid advertising, rather than the credibility of the authors. This results in uncertainty for the knowledge consumer about the products returned. Take, for instance, online search engines like Google and Bing: They do not fully expose their decision process when selecting information to return to an information consumer's requested keyword query.
  Inefficiencies when converting information artifacts into knowledge artifacts—often due to the central problem that no singular information artifact delivers a complete knowledge artifact. So a means by which one can quickly collect, classify and organize n-information artifacts and convert them into a singular knowledge artifact is not available.
  Inefficiencies when sharing knowledge artifacts—"How-to" publications are longstanding methods for sharing one's knowledge artifacts in a single binding. However in today's world, knowledge must evolve quickly in response to the constant influx of new information. In the technology sector for instance, by the time a technology publication is printed, its contents will be largely obsolete. Even online books pass through a number gateways and gatekeepers that make no contribution to the actual knowledge embodied in the artifact. Having a method and machine for rapidly building a credible knowledge artifact and sharing it is sharply needed.
  Inefficiencies when reorganizing knowledge artifacts for different purposes—This is a sub-problem of the artifact sharing problem. In order to rapidly build and share knowledge artifacts, it is vital to re-purpose existing artifacts effectively.

Here are a few information portals or software product classes that contribute to the above deficiencies, often because they that have not recognized the problems that are solved by the invention:
  Knowledge building software or Computer Supported Collaborative—example KnowledgeForum—All known examples of these technology products focus on non-guided and free-form repositories of informal notes contributed by individuals.
  Online forums such as Yahoo and Google Groups—Portals have no guided system for contextually classifying information artifacts, which transforms them into knowledge artifacts.
  Search engines that deliver lists of information artifacts, with little or no organization or prioritization based on credibility of the source. Even algorithms that return results based on popularity or number of "hits" only indicate the number of other knowledge consumers who were enticed, for a variety of reasons, to access that source. When a credible source is found, there is no way for the knowledge consumer to convert it into a knowledge artifact that would allow the consumer to readily rank, recall, and share credible knowledge and knowledge sources.
  Wikipedia.com—a collection of free-form electronic information artifacts. Consumers of these information products have no means for converting information artifacts into knowledge artifacts

DETAILED DESCRIPTION OF A PREFERRED EMBODIMENT

In a preferred embodiment of the present disclosure, a knowledge management system and method might include but not be limited to the following steps and/or elements:
Social Knowledge Network
  A Knowledge Network may consist of one or more groups of individuals that have subscribed to one or more Interest Groups. An Interest Group may be defined as a subject area with a discrete set of Ontological Lexical Hierarchies. The subscribed members of the Interest Group may choose the Ontological Lexical Hierarchies through the creation of Knowledge Artifact Classification Contexts (KACC or Classification Context used elsewhere in the present disclosure). The subscribed members may also perform Knowledge Artifact Position Moves (KAPM or Position Move used elsewhere in the present disclosure). Both Classification Contexts and Positions Moves are described in more detail, below.

Subscribed members to the system have a single Rating which may be used by the system and methods to compute scoring of Position Moves, assess the member's ranking across the entire system, and may factor into perceived credibility of individual Knowledge Artifacts.

Interest Groups may have the following attributes:
  Visibility—determines the level of privileges that an individual must hold in the knowledge network before they can subscribe to the Interest Group.
  Interest Group Maturity Stage—As Interest Groups develop Classification Context volumes that meet the maturity levels defined in the Game Theory Methods below.
  Subscriptions—Individuals may subscribe to an Interest Group if their knowledge network privilege level is equal to or greater than the visibility of the Interest Group.
  Invitations—Individuals may invite other individuals to subscribe to the Interest Group.
  Collections of Classification Contexts—Each Interest Group may have one or more Classification Contexts, which may be exchanged with—or copied to and from—other Interest Groups.

Interest Group Members may have the following attributes:
  Interest Group Role—Each subscribed member of an Interest Group will have a Role which assigns Interest Group privileges to them. Seven example roles and privileges associated with each Role are: Subscribe, Contributor, Editor, Moderator, Administrator, Publisher.

Interest Group Decision Making

The system and method of the present disclosure employs a Domain Hierarchy Profile Preference Ordering (DHPPO) that may be derived by computing the product of Interest Group member Classification Context preferences and the Classification Context lexical familiarity. The DHPPO may be used to derive Classification Context suggestions when members are performing Classification Context creation, editing and Classification Context exchanges.

Interest Group Maturity Stages

An Interest Group evolves as its Knowledgebase of Classification Contexts achieves higher ratings of knowledge worthiness. Each Interest Group begins with the "Fact Level" assignment and may receive new ratings as the group meets the criteria of the next Maturity Stage. Maturity Stages are ordered from lowest to highest and displayed in ascending order below. An Interest Group can have its rating lowered if the group no longer meets the criteria of a given Maturity Stage.

Fact Level is the most basic level with majority of Classification Contexts valued as useful facts. This level does not lead members to a better understanding of a Domain.
  Information Level contains Classification Contexts that contain complete Information Artifacts and lead a member to a better understanding of the Interest Domain but not guide them in their choices.
  Knowledge Level may be measured by having a majority of Classification Contexts that convey an understanding to the member that helped them see longer term benefits, plans or goals for themselves through decision guidance.
  Communal Learning Level may be measured by the effective use of Classification Contexts by Interest Group Membership that increases membership productivity and increases Interest Group membership.
  Wisdom Level may have Classification Contexts that prescribe a common societal purpose, values, vision and mission and have been adopted by a majority of the Interest Group membership. Shared leadership of Interest Group governance is achieved and a majority of Classification Contexts undergo updates and continued adoption by membership.
  Sustainable Level is achieved after Interest Group has achieved Wisdom Level and Interest Group leadership has experienced a changing of the leadership guard.

Game Theory Method

All game players know that in order to win at a game, they must first fully understand the rules of the game and the game strategies. Once understood, a successful player will understand the risks of their actions made during their turn and the potential reward of taking such a risk. All games have uncertainty as well, whether the game is solitaire or a multi-player online fantasy game, the uncertainty comes from not knowing the value of an overturned card or what another player has in their hand.

The gaming algorithms implemented in the present disclosure may be designed to reduce risks and increase certainty during the Knowledge Consumer and Knowledge Builders decision making process. The algorithms employed depend on whether the human actor is operating in a single-user mode or collaborative mode. Reducing risks associated with the human actor's action may be accomplished by narrowing the number of alternative actions available at any given time. Increasing certainty associated with the human actor's action may be accomplished by providing prescriptive outcomes that the actor can expect with the action choices. Reward understanding may be accomplished by providing Rules of Play and Credit Rewards that have uniformity across the spectrum of decisions and actions being made by the Knowledge Consumer and Knowledge Builder.

Scoring Classification Contexts

Relationship Scoring

There are 5 kinds of relationships that can exist between Classification Contexts. The following is a list of the relationships and their default point assignments. Interest Groups may assign different point values depending on their community preferences.
  Attribute-Of—1 point
  Antonym-Of—3 points
  Part-Of—5 points
  Kind-Of—5 points
  Application-Of—9 points Knowledge Level Rating Each Classification Context may also be rated for its knowledge level by members who adopt the Classification Context. There are three labels each adopting member may select: Fact, Information, Knowledge.

Classification Context Examples

The essential information elements contained in a Classification Context are shown in the figure below. In the example shown, the "Prenatal Diagnosis" Classification Context contains four member Classification Contexts and one Publication reference. The Member Classification Context box displays metadata about each Classification Context
  Context—Classification Context Name
  Relationship—Member relationship to the parent
  Level is the Knowledge Level of the member Publications is the count of publications that the Classification Context contains Adoptions is the count of instances that have been cloned from the member Classification Context The Publication box displays metadata about each publication Publication is the publication title of the publication reference Source is the original author or bibliographical artifact title associated with the publication Ranking provides a measure of credibility that may take into account the Member Ratings of those members that have adopted the publication's Classification Context as well as the Knowledge Level of the Classification Context associated with the publication.

Retrieving Classification Context Suggestions (Credibility, Publication Ranking)

Figure 1:
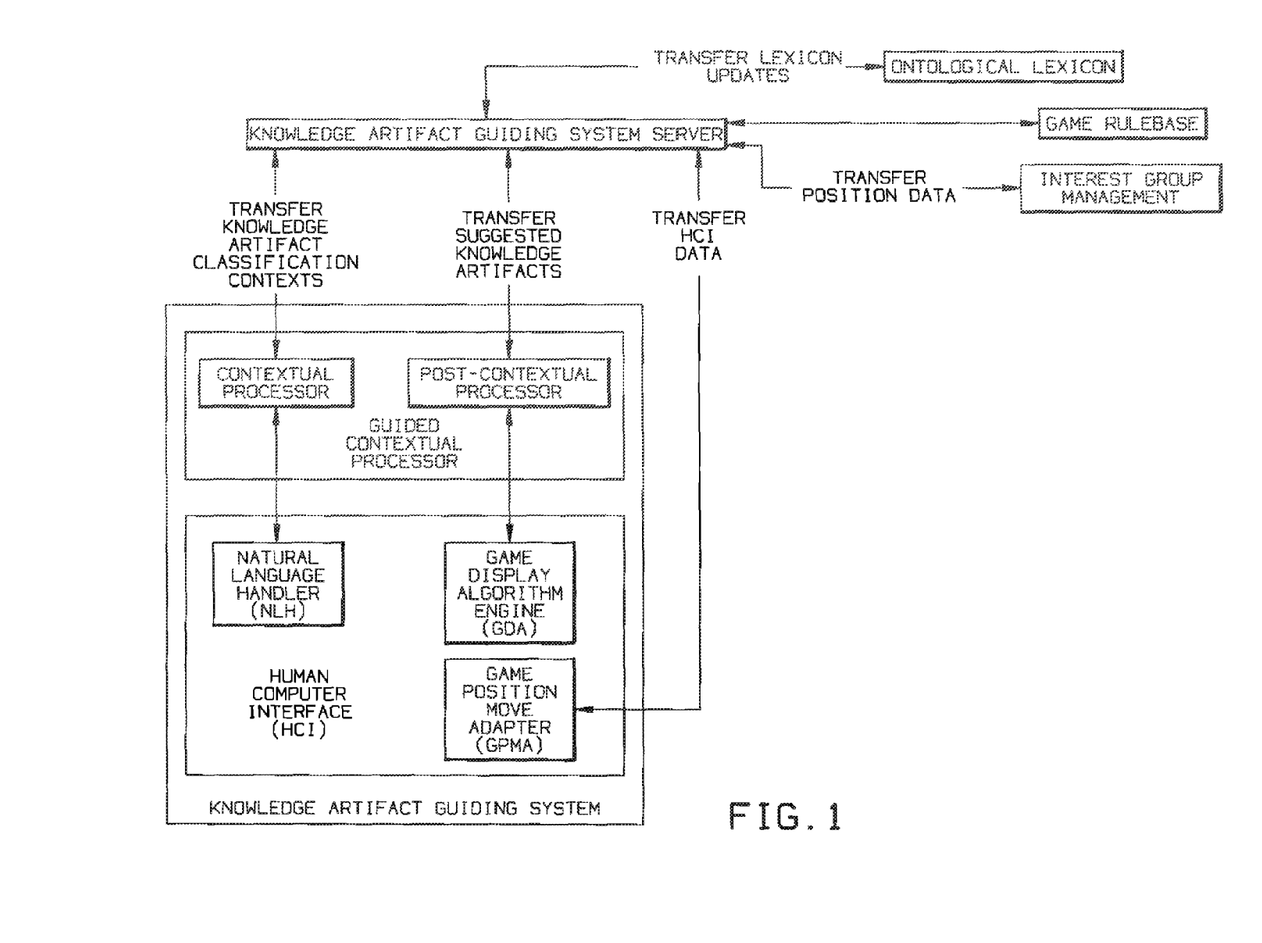
FIG. 1 illustrates a diagram that depicts the mandatory and optional components of a knowledge management system and method of the present disclosure. Within FIG. 1, the following components may be included in a knowledge management system.
Figure 2:
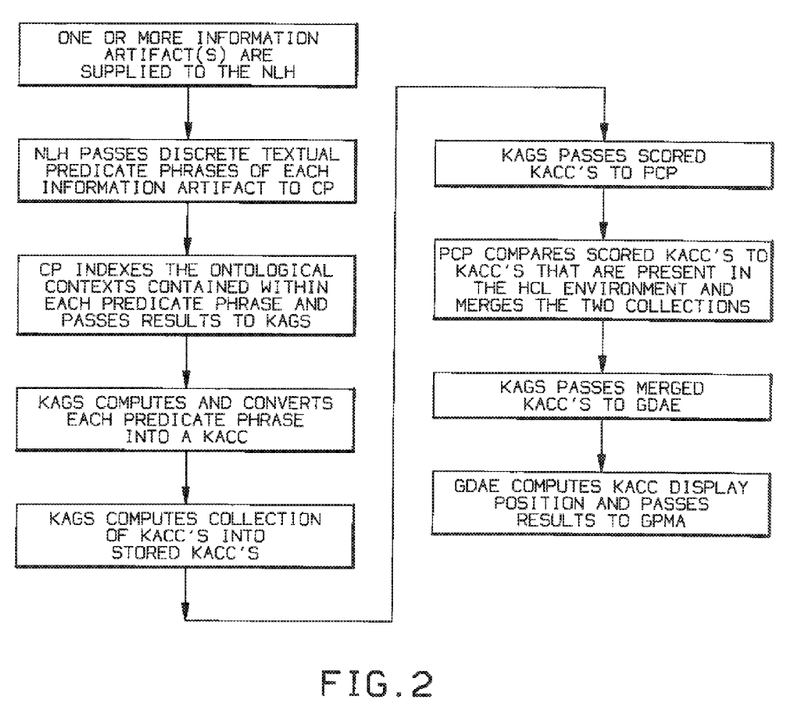
Figure 3:
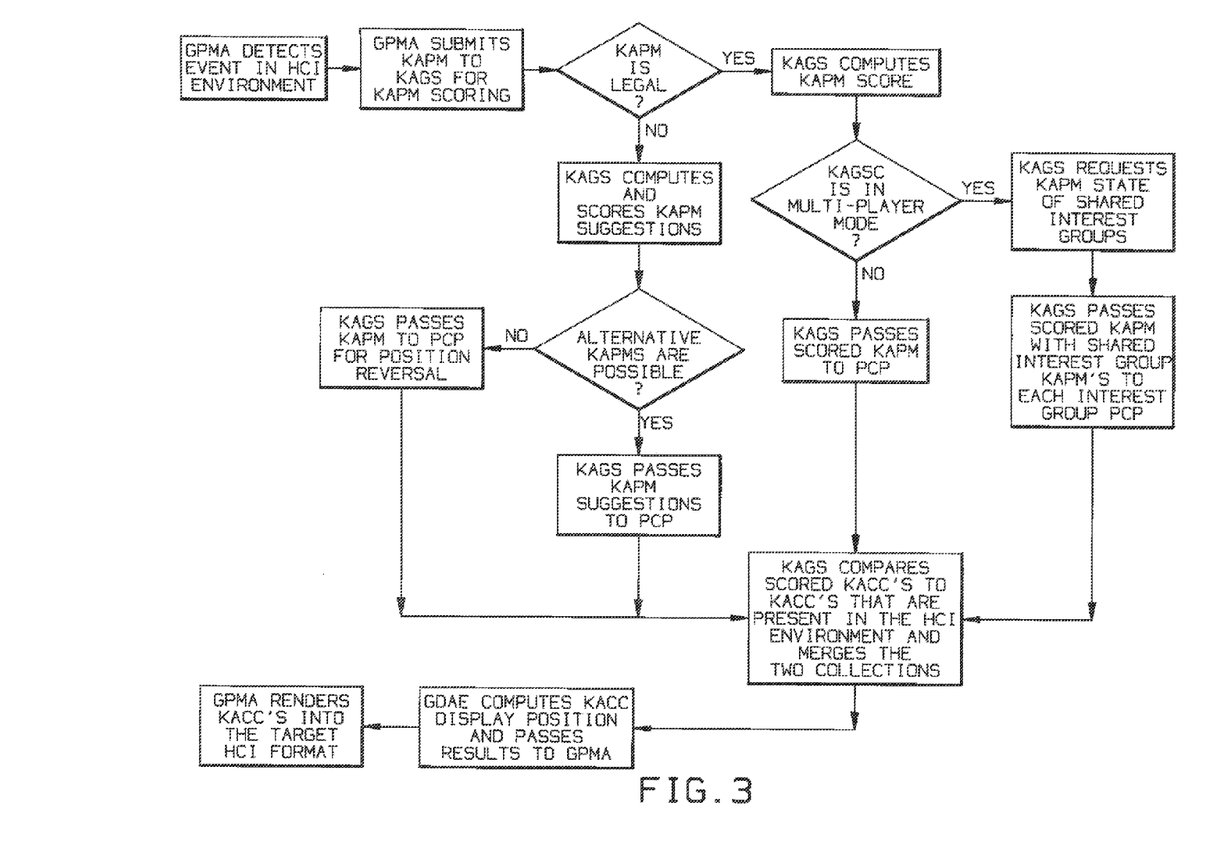
FIG. 3 illustrates a further method for guiding the collaboration between individuals that are connected to the Knowledge Artifact Guiding System (KAGS) and are building knowledge artifact context volumes. The steps for guiding the process of building knowledge artifacts from information artifacts are as follows.
Figure 4:
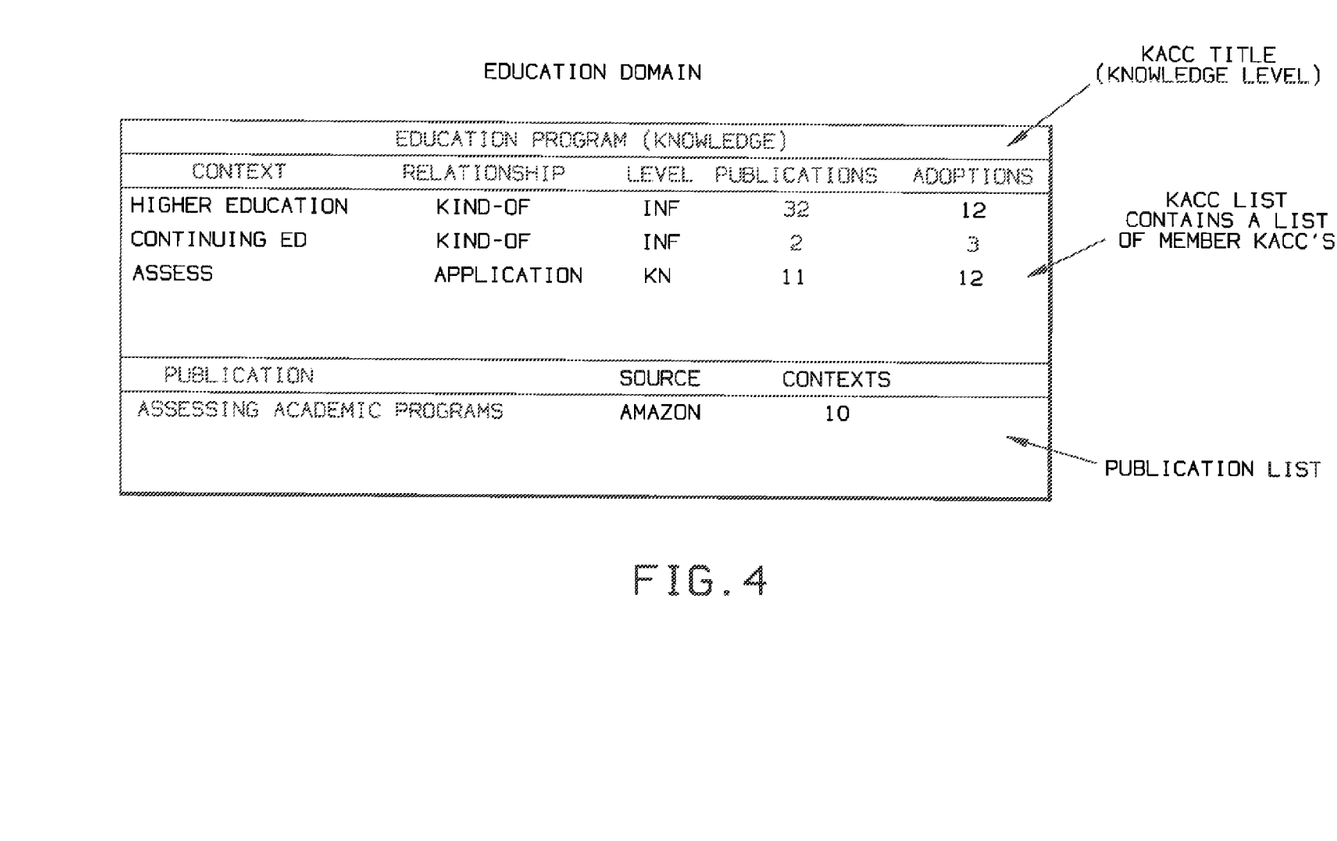
FIG. 4 illustrates a series of relationships for a particular title within a Classification Context domain. In this example, the domain is the educational domain. Within that domain, a Classification Context title of educational program may exist. Underneath that title, there may be series of relationships and types of relationships that exist between the educational program title and other member Classification Context's. Further underneath the listing of relationships may be a listing of all publications relating to the educational program title.
Figure 5:
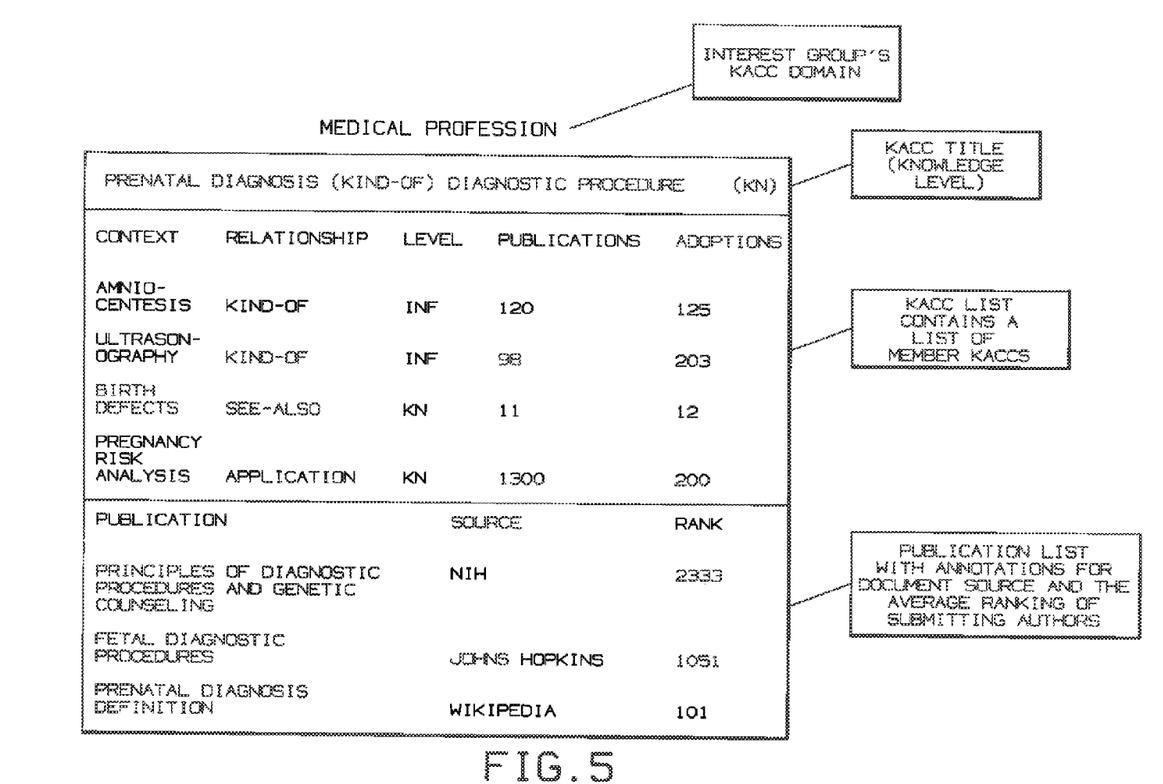
FIGS. 5 and 6 illustrate an example of the use of the system and method of the present disclosure in the context of diagnostic procedures in the medical profession.
Figure 6:
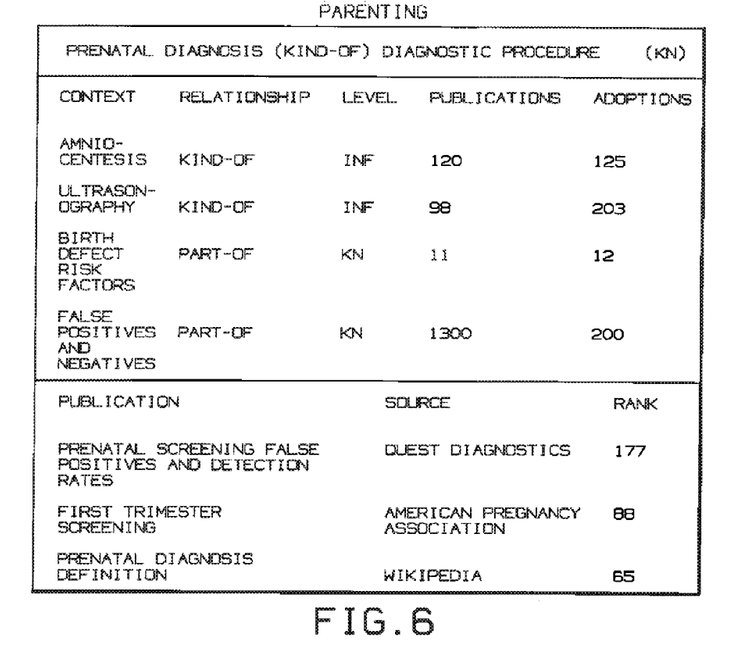

The system and method of the present disclosure will suggest Classification Contexts when a member initiates a search using one or more keywords. For example, if the member submits the keywords "diagnostic procedure", possible Classification Context Suggestions are shown in FIGS. 5. and 6. In this example, the suggested Classification Context exists in a knowledge base such as contemplated by the present disclosure and the suggestion provides the member with enough data about the Classification Context so that the member's decision has the lowest possible degree of risk.

The scenario shown in the example is that of a Medical Professional that enters the search phrase "Prenatal Diagnostics". In this case, the system and method may suggest two Classification Contexts, the first from the Diagnostic Procedure domain hierarchy from the Medical Profession Interest Group, the second from the Obstetrics domain hierarchy of the Parenting Interest Group.

Although the Medical Professional entered the "Prenatal Diagnosis" keywords for their search, the suggestions included the "Prenatal Screening" Classification Context, which is a synonym for the search terms.

The two Classification Contexts illustrate how the Classification Context structure is capable of conveying the following information:

Relevance of the Classification Context

Though the Prenatal Screening Classification Context has the same meaning as the Prenatal Diagnosis Classification Context, it contains member Classification Contexts and Publications that have a greater relevance to a parent or family member, while the "Prenatal Diagnosis" Classification Context illustrates that the publications and member Classification Contexts have subject matter written for the medical professional.

Publication Ranking

Publications are ranked by the average Member rankings. Each publication's source is named.

Classification Context Metrics

Classification Context metrics include the count of publications it contains, the number of Adoptions that it has and the knowledge level that it has achieved.

Building Classification Contexts, Reorganzing Classification Contexts and Converting Information Artifacts to Knowledge Artifacts Legal Knowledge Artifact Position moves (Position Move)

A member may make the following Knowledge Artifact Position Moves (Position Move) with newly created or existing Classification Contexts and their publications.

Placement onto an existing Classification Context as its member. A relationship of "kind-of", "part-of", "antonym-of", "application" or "See-also" must be declared. Existing Classification Contexts that are used in a Position Move must come from a different Classification Context domain hierarchy for credits to be awarded.

Placement as a new Domain Hierarchy for an Interest Group

Assignment of electronic publication references to one or more Classification Contexts.

Position Move Scoring

When a member issues a Position Move that places a Classification Context onto an existing Classification Context the system and methods will present them an opportunity to view an estimate of how the Classification Context score may affect their member rating. A scoring of the member's Position Move will not occur until the Position Move has been accepted by one of the following events:

A member that is assigned a moderator, Administrator or Publisher Role of the affected Interest Group has verified the Classification Context submission as accepted.

Three or more Interest Group Members have adopted the Classification Context.

There are two calculations performed when scoring a Classification Context Position Move Member Rating change for submitting member based on comparison results made between any sibling Classification Contexts combined with the ELO comparison made between the last modifying member of the Classification Context and the submitting Member.

Credit that is equal to the positive or negative integer results of the incremental rating change described above will be added or subtracted to the member's credit account of the affected Interest Group.

Example of Position Move, Previewing Scoring, Rating Change and Credits

A golf caddie is a simplified example of a knowledge consumer. Good caddies do more than carry clubs and track down wayward balls. When asked, a good caddie will give advice to golfers, such as, "The wind makes the ninth hole play 15 yards longer." Accurate advice may lead to a bigger tip at the end of the day. The golfer, having derived a benefit from the caddie's advice, may be more likely to play that course again. If a good caddie is willing to share what he knows with other caddies, then they all may eventually earn bigger tips. How would the invention work to make this happen?

The caddie master (Interest Group Publisher) may decide to reward for sharing their tips by offering them credits for pro shop merchandise. As advice is collected into Classification Contexts, it becomes available to all the caddies. The end result is that everyone wins. In this case, caddies get bigger tips and deals on merchandise, golfers play better because they benefit from the collective experience of caddies, and the course owners win because better scores lead to more repeat business.

Figure 7:
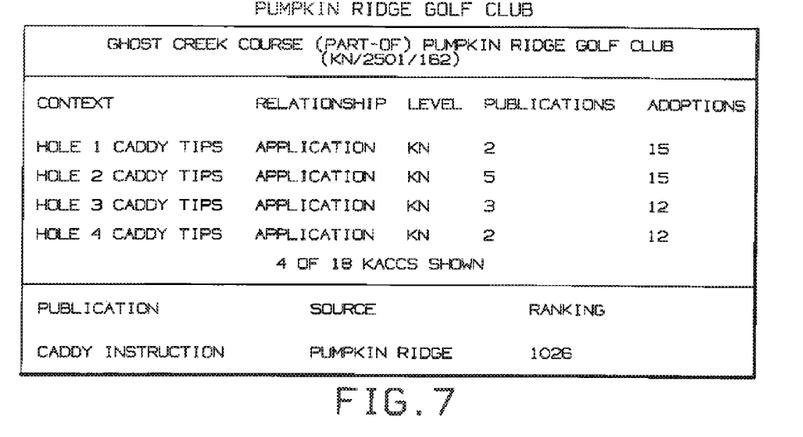
Figure 8:
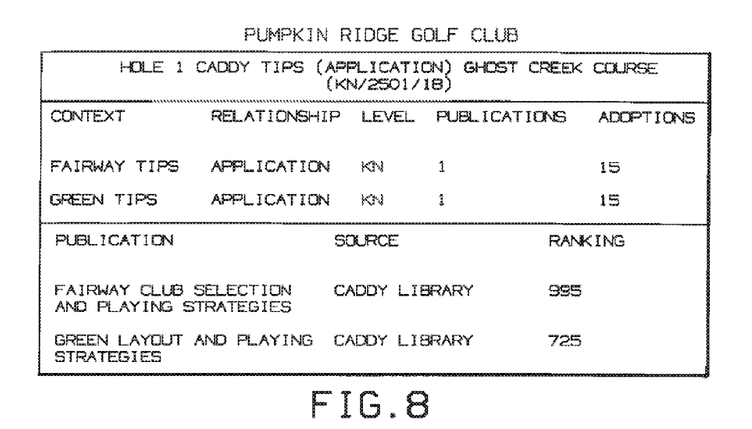
Figure 9:
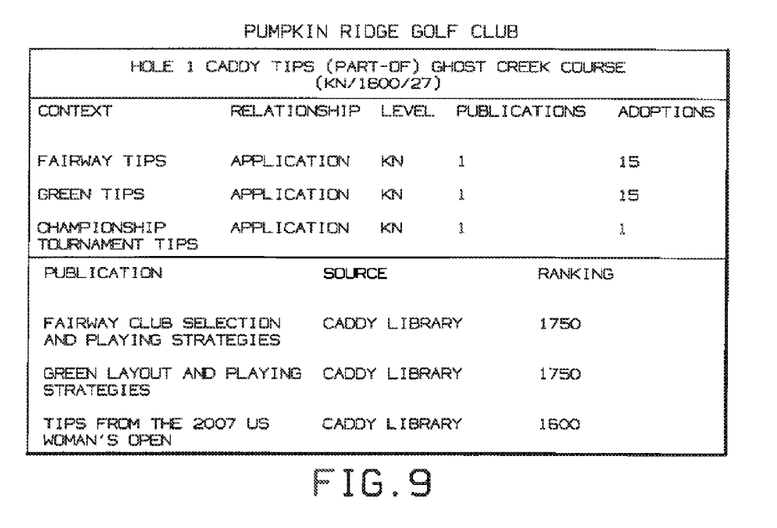

The procedure for a caddy to share their advice and receive credits as well as an improved rating across the Golf Course Interest Group would be as follows:

The Pumpkin Ridge Golf Club has a Classification Context domain hierarchy for their Ghost Creek Golf Course which may appear as shown in FIG. 7. A Caddy—John Caddy, makes a private copy of the "Hole 1 Caddy Tips"

child Classification Context shown in FIG. 8. and modifies it as shown by FIG. 9. The system then calculates the Score Potential and provides a preview of the possible Rating increase or decrease as shown in FIG. 10.

The Score Potential calculation considers the following factors during computation:

Natural Language textual analysis of the Classification Context publications to determine if each publication contains the lexical terms (or synonyms) of the Classification Contexts to which they are assigned. If not, the errant publication is flagged as ineligible.

Each member Classification Context score is added together to formulate a total Classification Context score of the submitted Classification Context and then is compared to the original Classification Context score of the original Classification Context. The system determines which Classification Context has the highest score and then performs the rating change calculation described below.

The system will perform a rating calculation based on the Elo Rating System.

The Elo rating system is a method for calculating the relative skill levels of players in two-player games such as chess. In the system it is used to compute the Rating Change of the two members that are participating in a Position Move.

Rating Change=K-factor*(Result−Expected Result)

Where Rating Change is an integer number that represents the incremental change to each player's rating.

Where the result is equal to 1 if the player won the move, 0 if the player lost the move and 0.5 if the move was a draw.

Where the Expected Result is a real number between 0.0 and 1.0 and represents the probability that a player will have in winning against the other player involved in the Position Move based on each player's current rating.

Example 1 with K-factor of 10: Player A rated 2000, played Position Move against Player B rated 1900 and won. The Rating Change for player A is therefore calculated as this (Result is 1, Expected Result 0.64):

Rating Change=K-factor*(Result−Expected Result)

Rating Change=10*(1−0.64)=10*0.36=3.6(rounded up to 4)

Interest Group Credits are either added or subtracted based on the Rating Change calculation. The credit is equal to the integer difference between the pre-calculation Rating and the post-calculation Rating. In Example 1, the Interest Group Credits awarded to player A would be 3.6 and the credits subtracted from Player B would be 3.6.

Converting Information Artifacts to Knowledge Artifacts

Context Classification provides the knowledge consumer the ability to discern the relevance and credibility of the publication references that Context Classification contains. One additional element provides a means by which the knowledge builder is able to assemble citations from multiple publications and deep link to the textual elements of the publications. FIG. 11. Demonstrates how three short deep link references to three different publications provides the Ghost Creek Golf Course Caddy with specific insights for hole 1 of the golf course. This method of tying one or more Context Classifications together with one or more publication deep links allows the knowledge consumer to access the specific knowledge needed for their application. In many cases, a single publication by itself is only useful for information purposes, but when its deep link reference is organized together with other deep link references which are tied together through Context Classifications, they become knowledge artifacts.

Natural Language Handling Methods

Ontological Lexicons such as Princeton University's Wordnet may be employed to provide the knowledge consumer and builder with guidance when classifying and organizing information artifacts into knowledge artifacts.

Natural Language Handler (NLH) refers to a method that evaluates natural language text in natural language sentence form and outputs suggestions to the knowledge consumer and builder that assist their decisions as to where to assign information and knowledge artifacts.

Game Software Engine for Guided Knowledge Acquisition

Employs game theory principles to guide knowledge consumer and knowledge worker in order to gain efficiencies in knowledge acquisition and knowledge building Natural language processing software and hardware engine for Knowledge Classification Automates the contextual classification of unstructured informational artifacts, which are transformed into knowledge artifacts Social knowledge networking software platform for Knowledge Community networking Organizes groups of individuals, public and private institutions into Subject Interest Groups in order to enable knowledge sharing The system and method of the present disclosure guides the knowledge consumer utilizing the knowledge base of predictive steps during the knowledge gathering, organizing, publishing and sharing steps. There are no solutions known today that attempt to solve the same problems that the present system and method has solved.

The value offering of the invention are its knowledge acquisition, building, sharing and publishing abilities. These four features serve the end goals of knowledge preservation, self-directed knowledge building, and community-directed knowledge building. In some cases, purveyors and builders of conventional information systems have no financial incentive to enable their information consumers to build privately controlled knowledge bases. In all cases, they have not recognized the intrinsic deficiencies of their information handling processes that organize information products for end-user consumption. The system and method of the present disclosure addresses several deficiencies present in the conventional information portals and may drastically increase the availability of credible and relevant knowledge to the public.

DESCRIPTION OF THE DRAWINGS

Knowledge Artifact Guiding System Server to provide the methods that perform
  Ontological Lexicon
  Interest Group Management
  Game Rulebase
Knowledge Artifact Guiding System Client
  Contextual Processor Post Contextual Processor
Natural Language Handler
Game Display Algorithm Engine
Game Position move Adapter
Human Computer Interface FIG. 2 illustrates a series of steps for guiding the contextual classification of large volumes of electronic artifacts containing complex concepts according to the present disclosure. These steps may include but are not limited to:

Step 1—One or more Information Artifact(s) are supplied to the Natural Language Handler (NLH).

Step 2—NLH passes discrete textual predicate phrases of each Information Artifact to Contextual Processor (CP).

Step 3—CP indexes the Ontological Contexts contained within each predicate phrase and passes the results on to a Knowledge Artifact Guiding System.

Step 4—Knowledge Artifact Guiding System (KAGS) computes and converts each predicate phrase into a Knowledge Artifact Context Classification (Classification Context).

Step 5—KAGS computes collection of Classification Contexts into scored Classification Contexts.

Step 6—KAGS passes scored Classification Contexts to the Post Contextual Processor (PCP)

Step 7—PCP compares scored Classification Contexts to Classification Contexts that are present in the Human Computer Interface (HCI) environment and merges the two collections Step 8 PCP passes merged Classification Contexts to Game Display Adapter Engineer (GDAE)

Step 9 GDAE computes Classification Context display position and passes results to the Game Position Move Adapter (GPMA)

The Guiding Position Move Adapter (GPMA) will detect that a Knowledge Artifact Position Move (Position Move) event has been received in the Human Computer Interface environment. It will submit the Position Move data to the Knowledge Artifact Guiding System (KAGS) for Position Move scoring. The KAGS first evaluates whether the Position Move is a legal move.

If the Position Move is a Legal Move

The KAGS will compute the Position Move score. Then the KAGS determines if it is in multi-player mode. If so, KAGS requests the Position Move state of Shared Interest Groups from the Interest Group Management System (IGMS). Then KAGS passes the scored Position Move with Shared Interest Group Position Moves to the PCP. If the KAGS is not in multi-player mode, the KAGS passes scored Position Move to PCP.

If the Position Move is not a Legal Move

The KAGS will evaluate whether alternative Position Move suggestions are available. If so, KAGS passes Position Move suggestions to PCP. If not, KAGS passes Position Move to PCP for position reversal.

The PCP Processes Received Scored Position Move(s)

Once the KAGS has prepared the scored Position Move(s), it sends them to the PCP as stated above. The PCP then compares scored Classification Contexts to Classification Contexts that are present in the HCI environment and merges the two collections. When finished, the PCP sends the merged collection of Position Move(s) to the GDAE and it computes the Classification Context display position and passes results to the GPMA. The GPMA renders Classification Contexts into the target HCI format.

The elements of the Knowledge Artifact Guiding System described herein can be used in the form of a physical board game, electronic board game and natural language translation of contextually classified knowledge artifacts.

FIGS. 7 to 11 illustrate an example of the use of the system and method of the present disclosure in the context of caddying.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

What is claimed is:

1. A system for guiding knowledge management, the system comprising:
    a knowledge artifact guiding system server including an ontological lexicon, a game rule base and interest group management; and,
    a knowledge artifact guiding system client including a guided context processor subsystem with a contextual processor and a post contextual processor, and a human computer interface with a natural language handler, a game display algorithm engine and a game position move adapter;
    wherein the ontological lexicon is configured to provide lexicon updates to the knowledge artifact guiding system server and the interest group management is configured to provide position data to the knowledge artifact guiding system server; and,
    wherein the guided contextual processor subsystem and the knowledge artifact guiding system server share knowledge artifact classification contexts and suggested knowledge artifacts; and,
    wherein the human computer interface subsystem and the knowledge artifact guiding system server share human computer interface position data.

2. A method of guiding the contextual classification of electronic artifacts containing complex concepts, the method comprising:
    providing each information artifact including one or more discrete textual predicate phrases and a plurality of ontological contexts;
    supplying one or more information artifacts to a natural language handler (NLH);

the NLH passing discrete textual predicate phrases of each information artifact to a contextual processor (CP);

the CP indexes the ontological contexts contained within each predicate phrase and passes the results on to a knowledge artifact guiding system (KAGS);

the KAGS computing and converting each predicate phrase into a knowledge artifact context classification (classification context) and creating a collection of classification contexts;

the KAGS computing the collection of classification contexts into a plurality of scored classification contexts;

the KAGS passing the scored classification contexts to a post contextual processor (PCP);

the PCP comparing the scored classification contexts to a plurality of classification contexts that are present in a human computer interface (HCI) environment and merging the two classification collections to create a merged classification contexts;

the PCP passing the merged classification contexts to a game display adapter engineer (GDAE);

the GDAE computing classification context display positions based on the merged classification contexts and passes the computed display positions to a game position move adapter (GPMA).

3. The method of claim 2, further comprising steps for guiding collaboration between individuals that are connected to the KAGS and are building knowledge artifact context volumes, the method further comprising:

the GPMA detecting that a knowledge artifact position move (position move) event has been received in the HCI environment and submitting the position move to the KAGS and the KAGS computing a position move scoring and then evaluating whether the position move is a legal move;

if the position move is a legal move, then the KAGS determining if the KAGS is in multi-player mode;

if the KAGS is in multi-player mode, the KAGS requesting a position move state of one or more shared interest groups from an interest group management system (IGMS) and the KAGS passing the scored position move to the PCP;

if the KAGS is not in multi-player mode, the KAGS passes scored position move directly to PCP;

if the position move is not a legal move, the KAGS evaluating whether any alternative position move suggestions are available, and if there are alternative position move suggestions available, the KAGS passes the alternative position move suggestions to the PCP;

if there are no alternative position move suggestions, the KAGS passes the position move to the PCP for position reversal;

when the PCP receives a position move, the PCP then comparing the scored classification contexts to classification contexts that are present in the HCI environment and merging the two collections into a merged collection;

the PCP sending the merged collection of position moves to the GDAE and the GDAE computing a classification context display position and passing these classification context display positions to the GPMA; and, the GPMA rendering the classification context display position of the merged collection of classification contexts into a format suitable for use by the HCI.

* * * * *